US008095000B2

(12) United States Patent
Shibuno et al.

(10) Patent No.: US 8,095,000 B2
(45) Date of Patent: Jan. 10, 2012

(54) CAMERA SYSTEM

(75) Inventors: Kouji Shibuno, Osaka (JP); Mitsuyoshi Okamoto, Osaka (JP); Taizo Aoki, Hyogo (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 12/029,868

(22) Filed: Feb. 12, 2008

(65) Prior Publication Data
US 2008/0199170 A1  Aug. 21, 2008

(30) Foreign Application Priority Data

Feb. 15, 2007 (JP) ................................. 2007-034819
Mar. 1, 2007 (JP) ................................. 2007-051328

(51) Int. Cl.
G03B 3/00 (2006.01)
G03B 13/00 (2006.01)

(52) U.S. Cl. ...................................................... 396/125
(58) Field of Classification Search .................... 396/79, 396/82, 125; 348/345, 351, 362, 364
See application file for complete search history.

(56) References Cited

U.S. PATENT DOCUMENTS

| 5,369,435 A * | 11/1994 | Ueda ............................... 348/353 |
| 5,387,960 A * | 2/1995 | Hirasawa et al. ............. 396/135 |
| 5,587,842 A * | 12/1996 | Iijima et al. .................... 359/698 |
| 5,648,836 A * | 7/1997 | Sato et al. ........................ 396/86 |
| 5,748,995 A * | 5/1998 | Kitagawa et al. ................ 396/55 |
| 5,790,902 A * | 8/1998 | Mizouchi et al. ............. 396/142 |
| 5,874,994 A * | 2/1999 | Xie et al. ........................ 348/349 |
| 6,034,727 A * | 3/2000 | Ito et al. .......................... 348/350 |
| 6,112,027 A * | 8/2000 | Sekine et al. ................... 396/52 |
| 6,172,709 B1 * | 1/2001 | Yamano et al. ............... 348/360 |
| 6,363,220 B1 * | 3/2002 | Ide .................................. 396/98 |
| 2002/0044206 A1 * | 4/2002 | Kyuma et al. ................. 348/240 |
| 2002/0080259 A1 * | 6/2002 | Izumi ............................. 348/348 |
| 2003/0189662 A1 | 10/2003 | Matsuda ........................ 348/345 |
| 2004/0257461 A1 * | 12/2004 | Toyomura ..................... 348/345 |
| 2006/0028577 A1 * | 2/2006 | Honjo et al. ................... 348/345 |
| 2006/0171699 A1 * | 8/2006 | Nakai et al. .................... 396/125 |

FOREIGN PATENT DOCUMENTS
JP 2003-295047 A 10/2003
* cited by examiner

Primary Examiner — Clayton E Laballe
Assistant Examiner — Warren Fenwick
(74) Attorney, Agent, or Firm — Hamre, Schumann, Mueller & Larson, P.C.

(57) ABSTRACT

In a camera system according to the present invention, a lens controller obtains an exposure synchronizing signal that is generated by a camera controller from a camera body, causes a configuration formed of a first encoder, a second encoder and a counter to detect the position of a focus lens according to the obtained exposure synchronizing signal, and notifies the camera body of the detected position of the focus lens. The camera controller associates the position of the focus lens or the mechanism member obtained from the lens controller with an AF evaluation value based on the exposure synchronizing signal, and controls an autofocus operation of the camera system based on the position and AF evaluation value that are associated with each other. With this configuration, it is possible to improve the accuracy of an autofocus operation with a contrast system.

9 Claims, 8 Drawing Sheets

CAMERA SYSTEM

BACKGROUND OF THE INVENTION

1. Field of the Invention

The present invention relates to a camera system with an interchangeable lens. In particular, the present invention relates to a camera system capable of an autofocus operation with a contrast system.

2. Description of Related Art

JP 2003-295047 A discloses an autofocus control combining a phase difference detection system and a contrast system. An imaging apparatus disclosed in JP 2003-295047 A corrects focusing control information obtained in the phase difference detection system based on focusing information obtained in the contrast system. In this control, correction information for compensating for the insufficiency of a detection accuracy in the phase difference detection system, which achieves an excellent high-speed property, is determined based on information indicating a focusing state using the contrast detection of a captured image, which enables a highly-accurate focus judgment. Thus, it is possible to perform a focus control at a higher speed with sufficient accuracy compared with a hybrid system between the contrast system and the phase difference detection system.

JP 2003-295047 A discloses an improvement in the focusing accuracy of the camera system with an interchangeable lens. However, it discloses the invention in which the focusing control information obtained in the phase difference detection system is corrected based on the focusing information obtained in the contrast system, thereby improving the focusing accuracy of the phase difference detection system, but fails to disclose improving the accuracy of the focusing information itself obtained in the contrast system.

SUMMARY OF THE INVENTION

It is an object of the present invention to provide a camera system with an interchangeable lens capable of improving the accuracy of an autofocus operation with a contrast system.

A camera system according to the present invention includes an interchangeable lens and a camera body. The camera body includes a signal generating portion that generates a timing signal periodically, an imaging device that generates image data by exposure at a timing in correlation with the generated timing signal, an evaluation value calculating portion that calculates an evaluation value for autofocus based on the generated image data, and a body control portion that controls the camera body. The interchangeable lens includes a focus lens that moves forward and backward along an optical axis direction, thereby varying a focusing state of a subject image, a driving member that drives the focus lens, a position detection portion that detects a position of the focus lens or a mechanism member moving together with the focus lens, and a lens control portion that controls the driving member according to a control signal from the body control portion. The lens control portion obtains the timing signal that is generated by the signal generating portion from the camera body, causes the position detection portion to detect the position of the focus lens or the mechanism member according to the obtained timing signal, and notifies the camera body of the detected position of the focus lens or the mechanism member. The body control portion associates the position of the focus lens or the mechanism member obtained from the lens control portion with the evaluation value calculated by the evaluation value calculating portion based on the timing signal that is generated by the signal generating portion, and controls an autofocus operation of the camera system based on the position and evaluation value that are associated with each other.

A camera system according to the present invention includes an interchangeable lens and a camera body. The camera body includes an imaging device that generates image data, and a body control portion that controls an autofocus operation of the camera system based on the generated image data. The interchangeable lens includes a focus lens that moves forward and backward along an optical axis direction, thereby varying a focusing state of a subject image, a driving member that drives the focus lens, a position detection portion that detects a position of the focus lens or a mechanism member moving together with the focus lens, and a lens control portion that controls the driving member in a first control mode or a second control mode based on the position of the focus lens or the mechanism member detected by the position detection portion. In the first control mode, the lens control portion cannot detect a reverse rotation of a driving direction of the focus lens based only on a result of detection by the position detection portion. In the second control mode, the lens control portion can detect the reverse rotation of the driving direction of the focus lens based only on the result of detection by the position detection portion. The lens control portion switches a control mode from the first control mode to the second control mode in response to a signal from the camera body indicating that the autofocus operation is started.

According to the present invention, in a camera system with an interchangeable lens, it is possible to improve the accuracy of an autofocus operation with a contrast system.

DETAILED DESCRIPTION OF THE INVENTION

Embodiment 1

[1. Configuration of Camera System]

[1-1. Overview of Camera System]

Figure 1:
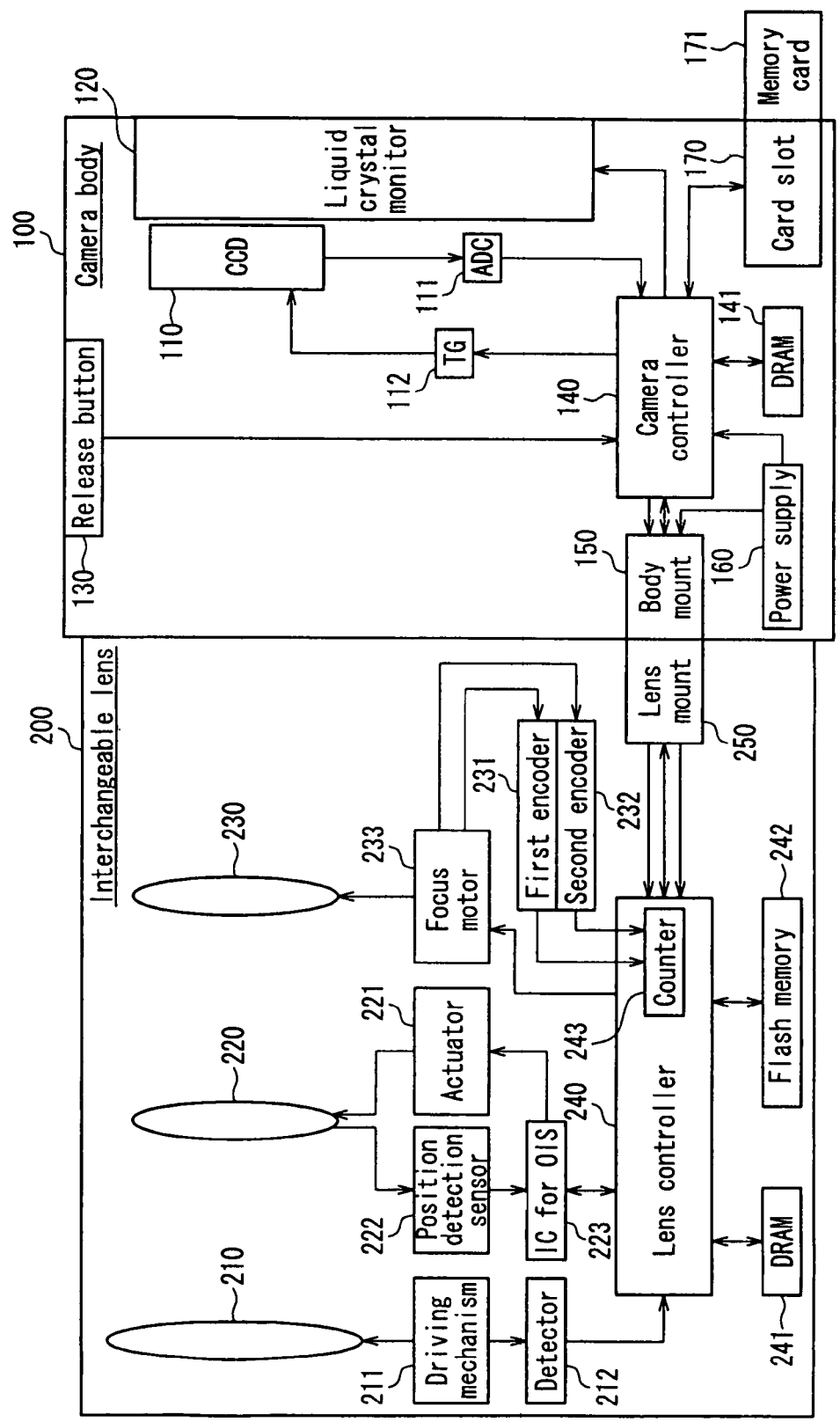
FIG. 1 is a block diagram showing a configuration of a camera system according to Embodiments 1 and 2.

FIG. 1 is a block diagram showing the configuration of a camera system 1 according to Embodiment 1 of the present invention. The camera system 1 includes a camera body 100 and an interchangeable lens 200 that can be attached to or detached from the camera body 100. The camera system 1 is capable of an autofocus operation with a contrast system based on image data generated in a CCD (charge coupled device) image sensor 110. The present invention was made in order to perform an autofocus operation with a contrast system at higher accuracy in a camera system with an interchangeable lens as described in Embodiment 1.

[1-2. Configuration of Camera Body]

The camera body 100 includes the CCD image sensor 110, a liquid crystal monitor 120, a camera controller 140, a body mount 150, a power supply 160 and a card slot 170.

The camera controller 140 controls an entire camera system 1 including the CCD image sensor 110 in response to an instruction from an operating member such as a release button 130. The camera controller 140 sends a vertical synchronizing signal to a timing generator 112. In parallel with this, the camera controller 140 generates an exposure synchronizing signal based on the vertical synchronizing signal. The camera controller 140 periodically and repeatedly sends the generated exposure synchronizing signal to a lens controller 240 via the body mount 150 and a lens mount 250. The camera controller 140 uses a DRAM (dynamic random access memory) 141 as a work memory at the times of a control operation and an image processing operation.

The CCD image sensor 110 forms a subject image that arrives via the interchangeable lens 200 and generates image data. The generated image data are digitized by an AD (analog-digital) converter 111. The image data that have been digitized by the AD converter 111 are subjected to various image processings in the camera controller 140. Examples of the "various image processings" here include gamma correction, white balance correction, scratch correction, YC conversion processing, electronic zooming, JPEG (Joint Photographic Expert Group) compression processing, etc.

The CCD image sensor 110 operates at timings controlled by the timing generator 112. The operation of the CCD image sensor 110 includes an operation of forming a still image, an operation of forming a through image, etc. Here, the through image is an image that is not to be recorded in the memory card 171 after it is formed. The through image mainly is a moving image and is displayed on the liquid crystal monitor 120 for composition to form a still image.

The liquid crystal monitor 120 displays an image indicated by display image data that have been subjected to the image processing in the camera controller 140. The liquid crystal monitor 120 is capable of displaying a moving image or a still image selectively.

A memory card 171 can be plugged into the card slot 170. The card slot 170 controls the memory card 171 under the control of the camera controller 140. The memory card 171 can store the image data generated by the image processing in the camera controller 140. For example, the memory card 171 can store a JPEG image file. Also, the memory card 171 can output the image data or image file that are stored therein. The image data or image file outputted from the memory card 171 are subjected to image processing in the camera controller 140. For example, the camera controller 140 expands the image data or image file obtained from the memory card 171 and generates display image data.

The power supply 160 supplies an electric power to be consumed in the camera system 1. The power supply 160 may be, for example, a dry battery or a rechargeable battery. Alternatively, the power supply 160 may supply the camera system 1 with the electric power that is fed externally through a power cord.

The body mount 150 can be connected mechanically and electrically to the lens mount 250 of the interchangeable lens 200. The body mount 150 can send data to and receive data from the interchangeable lens 200 via the lens mount 250. The body mount 150 sends the exposure synchronizing signal received from the camera controller 140 via the lens mount 250 to the lens controller 240. Also, the body mount 150 sends other control signals received from the camera controller 140 via the lens mount 250 to the lens controller 240. Further, the body mount 150 sends a signal received from the lens controller 240 via the lens mount 250 to the camera controller 140. Moreover, the body mount 150 supplies the electric power supplied from the power supply 160 via the lens mount 250 to the entire interchangeable lens 200.

[1-3. Configuration of Interchangeable Lens]

The interchangeable lens 200 includes an optical system, the lens controller 240 and the lens mount 250. The optical system of the interchangeable lens 200 includes a zoom lens 210, an OIS lens 220 and a focus lens 230.

The zoom lens 210 is a lens for varying the magnification of a subject image formed in the optical system of the interchangeable lens 200. The zoom lens 210 is formed of a single lens or a plurality of lenses. A driving mechanism 211 includes a zoom ring that is operable by a user, etc., transmits the operation by the user to the zoom lens 210 and moves the zoom lens 210 along an optical axis direction of the optical system. A detector 212 detects a driving amount in the driving mechanism 211. The lens controller 240 obtains the result of detection by the detector 212, thereby capturing a zooming factor in the optical system.

The OIS (optical image stabilizer) lens 220 is a lens for correcting blurring of a subject image formed in the optical system of the interchangeable lens 200. The OIS lens 220 moves in a direction that cancels out the shake of the camera system 1, thereby reducing the blurring of the subject image on the CCD image sensor 110. The OIS lens 220 is formed of a single lens or a plurality of lenses. An actuator 221 receives the control from an IC 223 for OIS and drives the OIS lens 220 within a plane perpendicular to an optical axis of the optical system. The actuator 221 can be realized by a magnet and a flat coil, for example. A position detection sensor 222 detects the position of the OIS lens 220 in the plane perpendicular to the optical axis of the optical system. The position detection sensor 222 can be realized by a magnet and a Hall element, for example. The IC 223 for OIS controls the actuator 221 based on the result of detection by the position detection sensor 222 and the result of detection by a shake detector such as a gyroscopic sensor. The IC 223 for OIS obtains the result of detection by the shake detector from the lens controller 240. Also, the IC 223 for OIS sends a signal indicating the state of an optical image blurring correction to the lens controller 240.

The focus lens 230 is a lens for varying the focusing state of a subject image formed on the CCD image sensor 110 in the optical system. The focus lens 230 is formed of a single lens or a plurality of lenses.

A focus motor 233 drives the focus lens 230 based on the control of the lens controller 240 so that the focus lens 230 moves forward and backward along the optical axis of the optical system. In this way, it is possible to vary the focusing state of the subject image formed on the CCD image sensor 110 in the optical system. The focus motor 233 can be a DC motor in Embodiment 1. However, the present invention is not limited to this, and the focus motor 233 also can be realized by a stepping motor, a servo motor, an ultrasonic motor or the like.

A first encoder 231 and a second encoder 232 generate a signal indicating a driving state of the focus lens 230. The first encoder 231 and the second encoder 232 can be realized by a rotor that is attached to a rotation shaft of the focus motor 233 and a photocoupler, for example. Here, the rotor is a disc having holes at predetermined intervals. The photocoupler emits light for detection from one side of the rotor and receives the light from the other side. Therefore, by the rotation of the rotor, ON/OFF states of the photocoupler are switched. The lens controller 240 has a counter 243 therein, which counts the number of switching of the ON/OFF states of the photocoupler. The first encoder 231 and the second encoder 232 are constituted so as to output pulses in synchronization with the ON/OFF states of the respective photocouplers. The pulse outputted from the first encoder 231 and the pulse outputted from the second encoder 232 are phase shifted from each other. Accordingly, based on the state of the second encoder 232 when the state of the first encoder 231 is switched from OFF to ON, it is possible to determine a moving direction of the focus lens 230. In other words, the state of the second encoder 232 when the state of the first encoder 231 is switched from OFF to ON can be an ON state or an OFF state. Thus, if the state of the first encoder 231 is switched from OFF to ON when the state of the second encoder 232 is ON, the counter 243 determines this to be "normal rotation of the focus motor 233" and counts as "+1." If the state of the first encoder 231 is switched from OFF to ON when the state of the second encoder 232 is OFF, the counter 243 determines this to be "reverse rotation of the focus motor 233" and counts as "−1." By adding these counted numbers, the lens controller 240 can grasp the moving amount of the focus lens 230.

The lens controller 240 controls the focus motor 233 in a first control mode or a second control mode. In the first control mode, the lens controller 240 cannot detect the reverse rotation of the driving direction of the focus lens 230 only from the result of detection by a position detection portion regarding the position of the focus lens 230. In the second control mode, the lens controller 240 can detect the reverse rotation of the driving direction of the focus lens 230 only from the result of detection by the position detection portion. More specifically, in the first control mode, the lens controller 240 controls the focus motor 233 using the first encoder 231 alone. In the case of using the first encoder 231, it is not possible to determine whether the focus motor 233 is rotating normally or reversely only from the information that the state of the first encoder 231 is switched from OFF to ON. Thus, in the first control mode, the lens controller 240 cannot detect that the driving direction of the focus lens 230 is reversed. On the other hand, in the second control mode, the lens controller 240 controls the focus motor 233 using the first encoder 231 and the second encoder 232. In the case of using the first encoder 231 and the second encoder 232, it is possible to determine from the state of the second encoder 232 whether the focus motor 233 is rotating normally or reversely when the state of the first encoder 231 is switched from OFF to ON, as described above. Thus, in the second control mode, the lens controller 240 can detect that the driving direction of the focus lens 230 is reversed.

The lens controller 240 controls the entire interchangeable lens 200 including the IC 223 for OIS, the focus motor 233, etc. based on a control signal from the camera controller 140. Also, the lens controller 240 receives a signal from the detector 212, the IC 223 for OIS, the first encoder 231, the second encoder 232, etc. and sends it to the camera controller 140. The lens controller 240 sends a signal to and receives it from the camera controller 140 via the lens mount 250 and the body mount 150. At the time of control, the lens controller 240 uses a DRAM 241 as a work memory. Further, a flash memory 242 stores a program and a parameter used when controlling the lens controller 240.

[1-4. Correspondence with Configuration of the Present Invention]

The CCD image sensor 110 is an example of an imaging device of the present invention. The camera controller 140 is an example of a body control portion of the present invention. The focus motor 233 is an example of a driving member of the present invention. The lens controller 240 is an example of a lens control portion of the present invention. The camera controller 140 is an example of a signal generating portion of the present invention. The camera controller 140 is an example of an evaluation value calculating portion of the present invention. The configuration formed of the first encoder 231 and the counter 243 is an example of a position detection portion in the first control mode of the present invention. The configuration formed of the first encoder 231, the second encoder 232 and the counter 243 is an example of a position detection portion in the second control mode of the present invention.

[2. Operation of Camera System]

[2-1. Operation of Preparing Image Forming]

Figure 2:
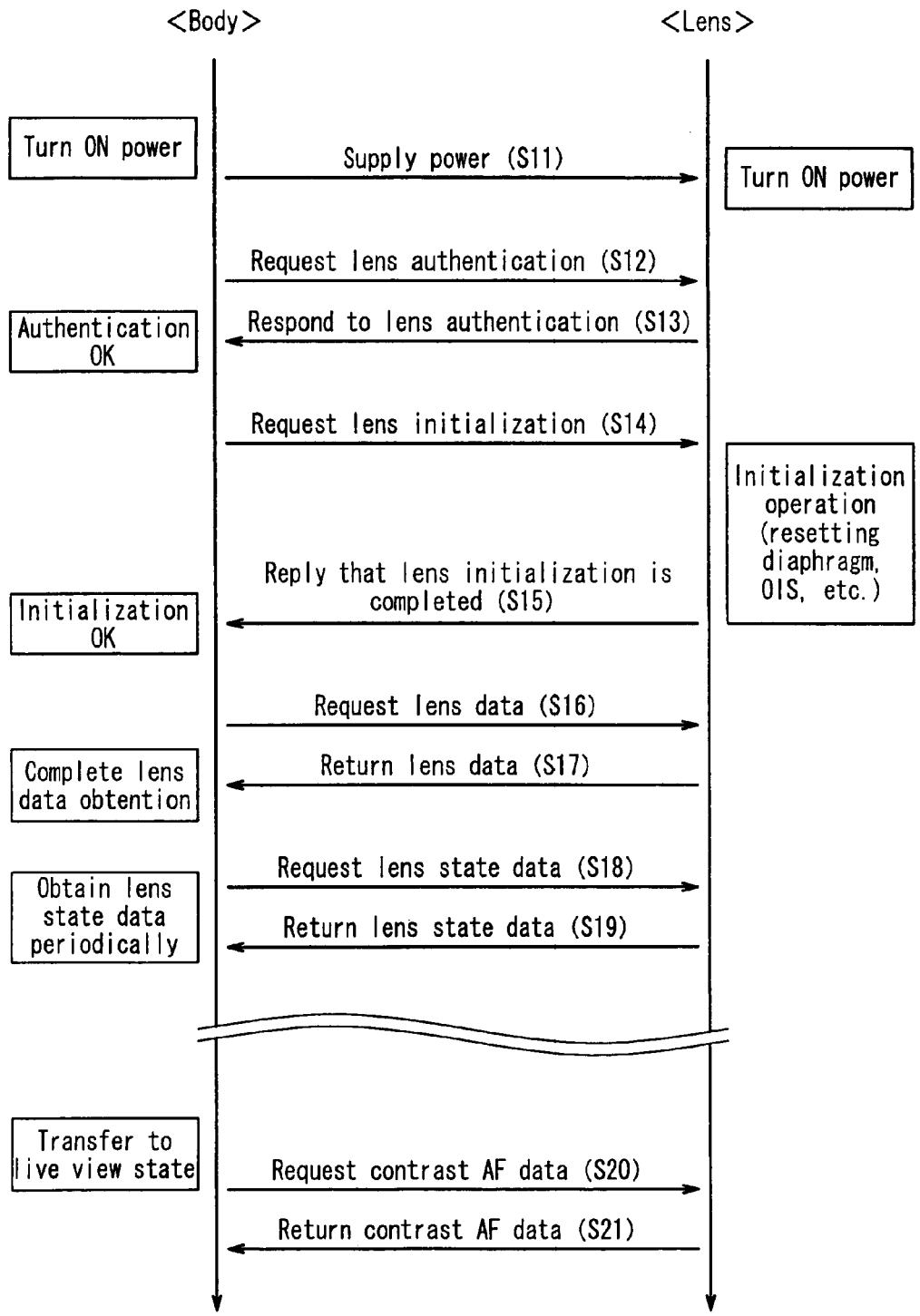
FIG. 2 is a drawing for describing an operation of preparing image forming in the camera system according to Embodiments 1 and 2.

First, the operation of the camera system 1 for preparing image forming will be described. FIG. 2 is a drawing illustrating the transition in which signals are sent and received for describing the operation of the camera system 1 for preparing image forming.

When a user turns ON the power of the camera body 100 while the interchangeable lens 200 is attached to the camera body 100, the power supply 160 supplies electric power to the interchangeable lens 200 via the body mount 150 and the lens mount 250 (S11).

Next, the camera controller 140 requests authentication information of the interchangeable lens 200 from the lens controller 240 (S12). Here, the authentication information of the interchangeable lens 200 includes information about whether or not the interchangeable lens 200 is attached and information about whether or not any accessory is attached. The lens controller 240 responds to the lens authentication request from the camera controller 140 (S13).

Subsequently, the camera controller 140 requests the lens controller 240 to perform an initialization operation (S14).

The lens controller 240 receives the initialization request from the camera controller 140 and performs the initialization operation such as resetting a diaphragm and resetting the OIS lens 220. Then, the lens controller 240 replies to the camera controller 140 that the lens initialization operation has been completed (S15).

Next, the camera controller 140 requests lens data from the lens controller 240 (S16).

The lens data are stored in the flash memory 242. Thus, the lens controller 240 reads out the lens data from the flash memory 242 and returns them to the camera controller 140 (S17). Here, the "lens data" are characteristic values unique to the interchangeable lens 200 such as a lens name, an F number and a focal length.

When the camera controller 140 has the lens data of the interchangeable lens 200 attached to the camera body 100, the camera is now able to form an image. In this state, the camera controller 140 periodically requests lens state data indicating the state of the interchangeable lens 200 from the lens controller 240 (S18). The lens state data include, for example, zooming factor information by the zoom lens 210, positional information of the focus lens 230, F number information, etc.

The lens controller 240 receives the lens state data request from the camera controller 140 and returns the requested lens state data to the camera controller 140 (S19).

In this state, the camera system 1 is capable of operating in a control mode in which an image indicated by image data generated in the CCD image sensor 110 (a through image) is displayed on the liquid crystal monitor 120. This control mode is referred to as a "live view mode." In the live view mode, since an image that is being formed by the CCD image sensor 110 (a through image) is displayed on the liquid crystal monitor 120, a user can compose a still image to be formed while looking at the through image displayed on the liquid crystal monitor 120. The user can select whether or not the camera system 1 should be set to the live view mode. Other than the live view mode, the user also can select a control mode in which a subject image from the interchangeable lens 200 is guided to an optical view finder (not shown). In order to achieve this control mode, it is necessary to provide a movable mirror for guiding the subject image to the optical view finder (not shown), etc. As a system for an autofocus operation in the live view mode, a contrast system is appropriate. This is because, as image data are generated constantly in the CCD image sensor 110 in the live view mode, it is easy to carry out the autofocus operation with the contrast system using that image data.

At the time of carrying out the autofocus operation with the contrast system, the camera controller 140 requests contrast AF data from the lens controller 240 (S20). The contrast AF data are data necessary for the autofocus operation with the contrast system and include, for example, a focus driving speed, a focus shifting amount, an image magnification, contrast AF possibility information, etc.

[2-2. Autofocus Operation with Contrast System]

Figure 3:
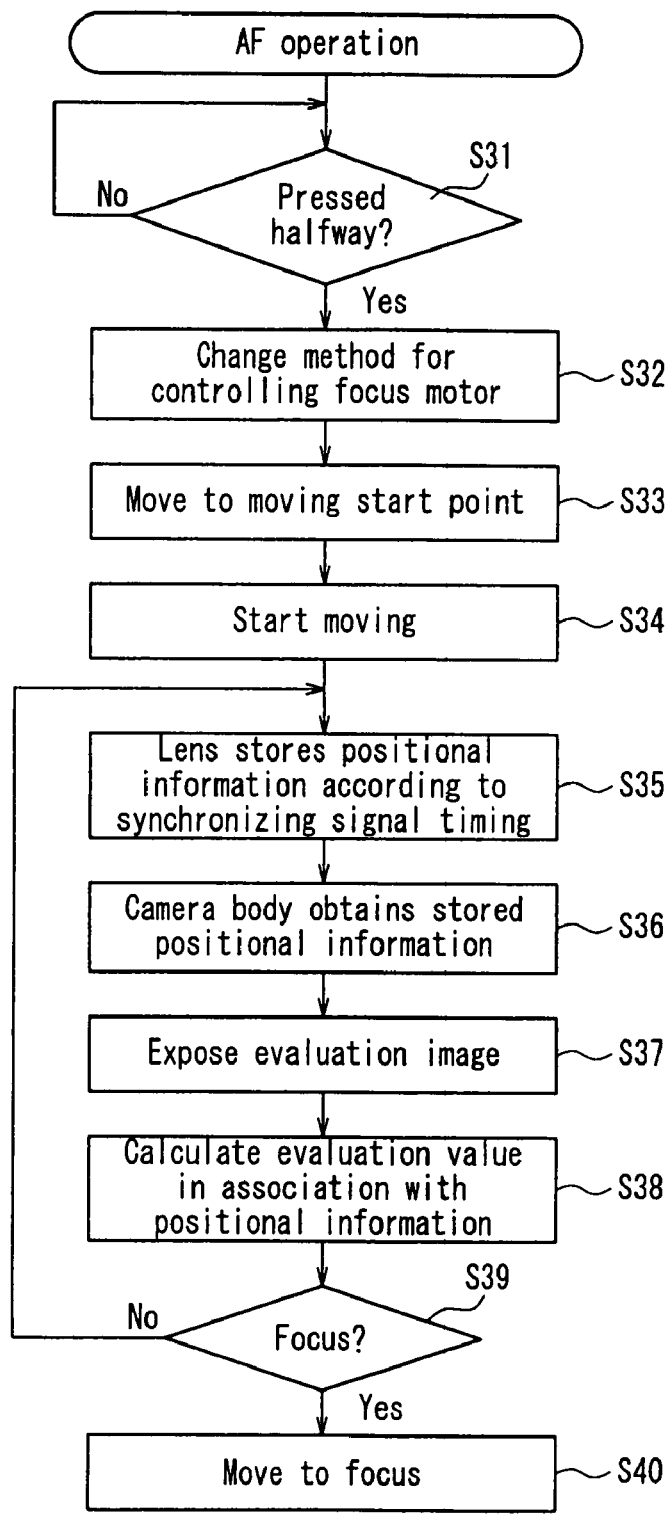
FIG. 3 is a flowchart for describing an autofocus operation with a contrast system in the camera system according to Embodiment 1.
Figure 4:
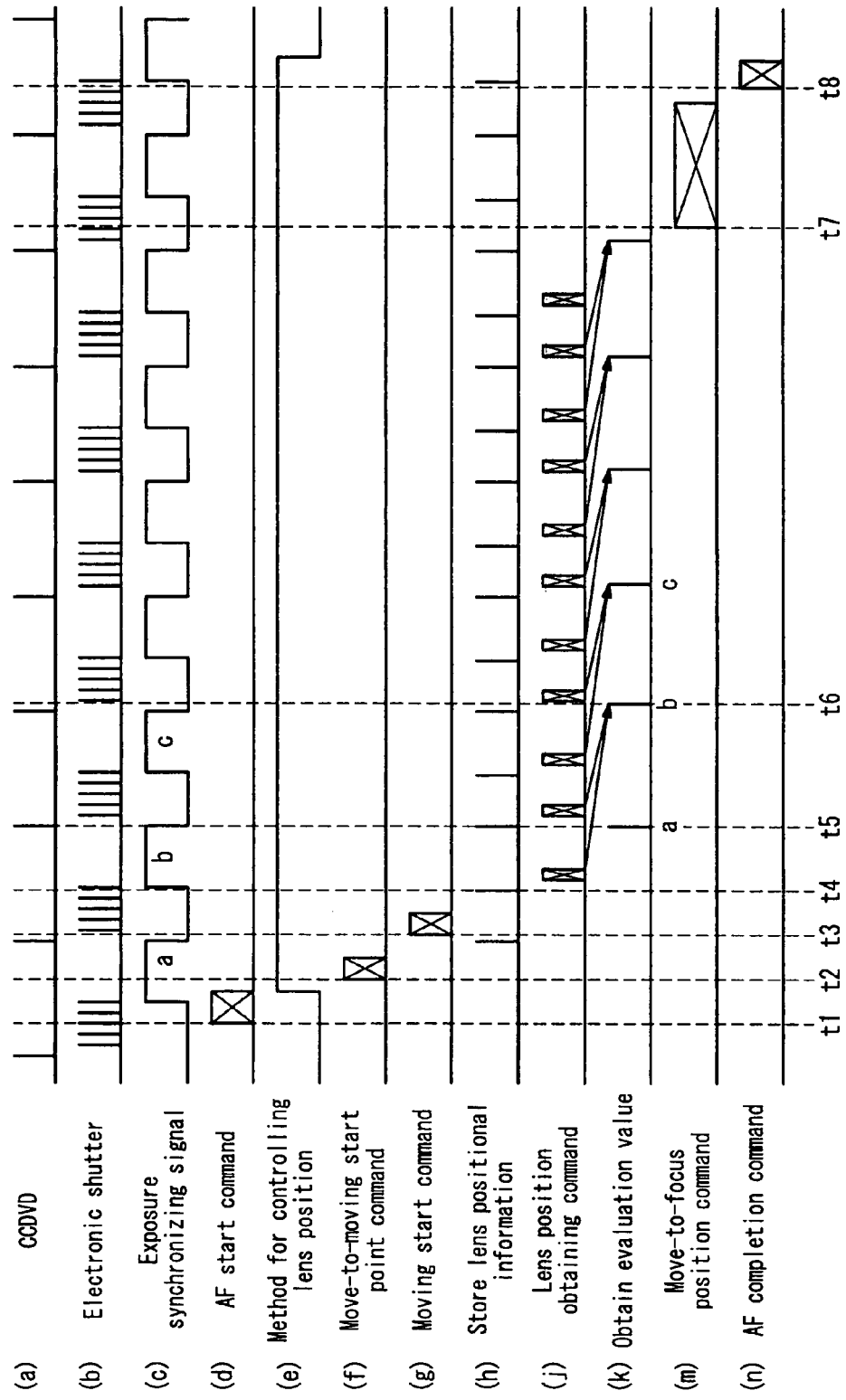
FIG. 4 is a timing chart for describing the autofocus operation with the contrast system in the camera system according to Embodiment 1.

The following is a description of the autofocus operation in the camera system 1 that is now ready for image forming as above, with reference to FIGS. 3 and 4. Herein, the autofocus operation with the contrast system will be described.

FIG. 3 is a flowchart for describing the autofocus operation. FIG. 4 is a timing chart at the time of the autofocus operation.

It is assumed that the camera controller 140 is operating in the live view mode. In this state, the camera controller 140 periodically generates a vertical synchronizing signal as shown in FIG. 4(*a*). In parallel with this, the camera controller 140 also generates an exposure synchronizing signal based on the vertical synchronizing signal as shown in FIG. 4(*c*). The camera controller 140 can generate the exposure synchronizing signal because it captures an exposure start timing and an exposure end timing in advance with reference to the vertical synchronizing signal. The camera controller 140 outputs the vertical synchronizing signal to the timing generator 112 and outputs the exposure synchronizing signal to the lens controller 240. In synchronization with the exposure synchronizing signal, the lens controller 240 obtains positional information of the focus lens 230. This will be described later.

Based on the vertical synchronizing signal, the timing generator 112 periodically generates a readout signal of the CCD image sensor 110 and an electronic shutter driving signal as shown in FIG. 4(*b*). Based on the readout signal and the electronic shutter driving signal, the timing generator 112 drives the CCD image sensor 110.

In other words, in response to the readout signal, the CCD image sensor 110 reads out pixel data generated by a large number of photoelectric conversion elements (not shown) present in the CCD image sensor 110 to a vertical transfer portion (not shown). Although the readout signal and the vertical synchronizing signal match in the present embodiment, this is not always necessary when putting the present invention into practice. In other words, the vertical synchronizing signal and the readout signal may be shifted from each other. In short, the vertical synchronizing signal and the readout signal only have to be synchronized with each other.

Further, the CCD image sensor 110 carries out an electronic shutter operation according to the electronic shutter driving signal. In this way, the CCD image sensor 110 can clear out unwanted electric charges therefrom. The electronic shutter driving signal includes a group of plural signals that are emitted periodically within a short period of time. For example, one group consists of ten signals. While one group of signals in the electronic shutter driving signal is emitted, the CCD image sensor 110 performs one electronic shutter operation for each signal. If the number of signals contained in one group in the electronic shutter driving signal is increased, the electric charges accumulated in the CCD image sensor 110 can be cleared out reliably. However, this complicates the method for driving the CCD image sensor 110.

Accordingly, since the CCD image sensor 110 clears out the electric charges by the electronic shutter driving signal and reads out the pixel data to the vertical transfer portion (not shown) by the readout signal, it performs an exposure operation for image data for a through image during a period from the last signal in one group in the electronic shutter driving signal to the vertical synchronizing signal (see FIG. 4(*c*)).

In the above-described state, the camera controller 140 monitors whether or not the release button 130 is pressed halfway (S31). Now, it is assumed that the release button 130 is pressed halfway at timing t1 in FIG. 4. Then, the camera controller 140 issues an AF start command to the lens controller 240 as shown in FIG. 4(*d*). The AF start command indicates that the autofocus operation with the contrast system is started.

When the lens controller 240 receives the AF start command, it changes the control mode of the focus motor 233 from the first control mode to the second control mode (S32). The first control mode has a relatively low accuracy for detecting the reverse rotation of the driving direction of the focus lens 230 that is not intended by the lens controller 240, and the second control mode has a relatively high accuracy for detecting such reverse rotation. More specifically, the focus motor 233 is controlled based only on the detection result of the first encoder 231 in the first control mode, whereas it is controlled based on the detection results of the first encoder 231 and the second encoder 232 in the second control mode.

Further, the lens controller 240 stores in the DRAM 241 a numerical value indicated by the counter 243 (the number of pulses) when the control mode is switched to the second control mode. Then, the lens controller 240 controls the focus motor 233 with reference to this value.

During the autofocus operation with the contrast system, the control mode of the focus motor 233 is set to the second control mode as described above. This is because it is necessary to capture accurately the reverse rotation of the focus motor 233, which sometimes occurs midway through the calculation of a focal point in the autofocus operation with the contrast system. The reverse rotation of the driving direction of the focus lens 230 can be captured to a certain extent by judging the polarity of a driving power applied to the focus motor 233. However, when the focus lens 230 is driven, the driving direction of the focus lens 230 is reversed in some cases, even though the polarity of the driving power applied to the focus motor 233 remains unchanged. In those cases, if the focus motor 233 is controlled in the first control mode, the lens controller 240 cannot capture the reverse rotation of the driving direction of the focus lens 230. Thus, the accuracy for detecting the reverse rotation of the driving direction of the focus lens 230 is relatively low. In contrast, the control in the second control mode allows the lens controller 240 to subtract the change in the number of pulses during the reverse rotation so as to calculate the current number of pulses accurately. In other words, the accuracy for detecting the reverse rotation of the driving direction of the focus lens 230 is relatively high. Whether or not the lens controller 240 can capture the reverse rotation that is not intended by the lens controller 240 in the reverse of the moving direction of the focus lens 230 determines this degree of accuracy.

Now, the following is the reason why the focus motor 233 is controlled in the first control mode before the autofocus operation with the contrast system is started. Briefly speaking, in such a state before starting the autofocus operation with the contrast system, the lens controller 240 does not need to capture the unintended reverse rotation of the focus motor 233. If the focus motor 233 is controlled in the second control mode when not needed, the system only becomes complicated. When the autofocus operation with the contrast system is not carried out, it is sufficient to change the generation timing of pulses from a certain position in one direction. In other words, it is necessary to perform an absolute positional control considering the reverse rotation of the focus motor 233 in the autofocus operation with the contrast system, whereas it is sufficient to perform a relative positional control without considering the reverse rotation of the focus motor 233 in the other operations.

Also, when the absolute positional control is kept, the number of pulses counted by the counter 243 and an actual position sometimes become different. This is attributable to the accumulation of errors based on the backlash of the focus motor 233, etc. at the time of reverse rotation. On the other hand, by changing the control mode from the first control mode to the second control mode at the start of the autofocus operation with the contrast system, it is possible to control accurately the position of the focus lens 230 during the autofocus operation with the contrast system. This is because, at the time of changing the control mode from the first control mode to the second control mode, the number of pulses serving as the reference has to be stored, and the position of the focus lens 230 is controlled with reference to that number of pulses immediately before starting the autofocus operation with the contrast system. Using such number of pulses as the reference in this way makes it possible to reduce the difference between the reference number of pulses for the absolute positional control and the actual position of the focus lens 230. A period from the time when the reference number of pulses is grasped until the autofocus operation with the contrast system can be shortened, and it can be said that such a shortened period means that the number of rotation reverses of the focus motor 233 also is small.

Thereafter, the camera controller 140 sends a move-to-start point command to the lens controller 240 at timing t2. This command indicates to which position the focus lens 230 is moved at the start of the autofocus operation with the contrast system and in which direction the focus lens 230 is moved during the detection of an AF evaluation value. The lens controller 240 receives this command and controls the focus motor 233. By the control of the lens controller 240, the focus motor 233 moves the focus lens 230 to the position indicated by the move-to-start point command (S33).

Next, at timing t3, the camera controller 140 issues a moving start command to the lens controller 240 (S34). The lens controller 240 starts sending positional information of the focus lens 230 periodically.

During this period, as shown in FIG. 4(h), the lens controller 240 both drives the focus motor 233 according to the instruction from the camera controller 140 and sequentially stores the number of pulses of the counter 243 when the exposure synchronizing signal is switched from OFF to ON and the number of pulses of the counter 243 when the exposure synchronizing signal is switched from ON to OFF in the DRAM 241 (S35).

Subsequently, the camera controller 140 periodically sends a lens position information obtaining command to the lens controller 240. The lens controller 240 receives this command and sends the number of pulses stored in the DRAM 241 in association with the exposure synchronizing signal to the camera controller 140 (S36).

On the other hand, the CCD image sensor 110 sends image data that are exposed and generated during an exposure period to the camera controller 140 via the AD converter 111 (S37).

Based on the received image data, the camera controller 140 calculates an evaluation value for the autofocus operation (hereinafter, referred to as an AF evaluation value, for the sake of convenience). More specifically, a method is known in which brightness signals are determined from the image data generated in the CCD image sensor 110, followed by adding up high frequency components of the brightness signals in a screen, thereby calculating the AF evaluation value. This calculated AF evaluation value is stored in the DRAM 141 in association with the exposure synchronizing signal. Also, the lens positional information obtained from the lens controller 240 is associated with the exposure synchronizing signal. Therefore, the camera controller 140 can store the AF evaluation value in association with the lens positional information (S38). For example, the AF evaluation value calculated using the image data exposed in a period b in FIG. 4(c) is stored in association with an average of the position of the focus lens 230 at timing t4 and that at timing t5. In this way, the AF evaluation value calculated using the image data exposed in the period b in FIG. 4(c) is stored in the DRAM 141 at timing t6.

Next, the camera controller 140 monitors whether or not the focal point has been extracted based on the AF evaluation value stored in the DRAM 141 (S39). More specifically, the position of the focus lens 230 when the AF evaluation value is maximal is extracted as the focal point. If the focal point cannot be extracted, the operation returns to Step S35. Until the focal point is extracted, the operations from Steps S35 to S39 are repeated.

If the focal point is extracted in Step S39, then the camera controller 140 sends a move-to-focus position command to the lens controller 240. The move-to-focus position command indicates from which direction and to which position the focus lens 230 is moved. The lens controller 240 drives the focus motor 233 according to this move-to-focus position command. When the movement to the focal point is completed, the camera controller 140 sends an AF completion command to the lens controller 240 (at timing t8, S40). The lens controller 240 receives this command and changes the method for controlling the focus motor 233 from the second control mode back to the first control mode as shown in FIG. 4(e). In this manner, the autofocus operation with the contrast system is completed, returning to the control in the live view mode (S40).

[3. Effects of Embodiment, etc.]

As described above, the camera system 1 according to Embodiment 1 of the present invention includes the interchangeable lens 200 and the camera body 100. The camera body 100 includes the camera controller 140 that generates the timing signal periodically and the CCD image sensor 110 that generates the image data by exposure at the timing in correlation with the generated timing signal. Also, the camera controller 140 calculates the evaluation value for autofocus based on the generated image data. Further, the camera controller 140 controls the camera body 100. The interchangeable lens 200 includes the focus lens 230 that moves forward and backward along the optical axis direction, thereby varying the focusing state of the subject image, the focus motor 233 for driving the focus lens 230, the configuration formed of the first encoder 231, the second encoder 232 and the counter 243 that detect the position of the focus lens 230 or a mechanism member moving together with the focus lens 230, and the lens controller 240 that controls the focus motor 233 according to the control signal from the camera controller 140. The lens controller 240 obtains the timing signal that is generated in the configuration formed of the camera controller 140 and the timing generator 112 from the camera body 100, causes the configuration formed of the first encoder 231, the second encoder 232 and the counter 243 to detect the position of the focus lens 230 according to the obtained timing signal, and notifies the camera body 100 of the detected position of the focus lens 230. Based on the timing signal generated in the configuration formed of the camera controller 140 and the timing generator 112, the camera controller 140 associates the position of the focus lens 230 or the mechanism member obtained from the lens controller 240 with the evaluation value calculated in the camera controller 140 and controls the autofocus operation of the camera system 1 based on these associated position and evaluation value.

In this manner, the camera controller 140 sends the exposure synchronizing signal to the lens controller 240, and the lens controller 240 obtains the positional information of the focus lens 230 in synchronization with the exposure synchronizing signal, so that the camera controller 140 can determine accurately the timing of obtaining the positional information of the focus lens 230. Also, the camera controller 140 can calculate the AF evaluation value in synchronization with the exposure synchronizing signal. Accordingly, it is possible to make the positional information of the focus lens 230 obtained from the lens controller 240 and the calculated AF evaluation value correspond to each other accurately. Thus, in the autofocus operation with the contrast system, the focal point can be determined accurately. In this way, the camera system 1 with a favorable focusing state can be achieved.

Here, in Embodiment 1, the exposure synchronizing signal of the CCD image sensor 110 has been used as the timing signal of the present invention. The exposure synchronizing signal consists of a signal indicating the start of exposure in the CCD image sensor 110 and a signal indicating the end of exposure therein. In other words, the rising of the exposure synchronizing signal indicates the start of exposure in the CCD image sensor 110, and the falling of the exposure synchronizing signal indicates the end of exposure therein.

Further, in the camera system according to Embodiment 1, the lens controller 240 controls the focus motor 233 in the first control mode or the second control mode based on the position of the focus lens 230 detected in the configuration formed of the first encoder 231, the second encoder 232 and the counter 243. Here, the first control mode is a control mode in which the lens controller 240 cannot detect the reverse rotation of the driving direction of the focus lens 230 based only on the result of detection by the configuration formed of the first encoder 231 and the counter 243. The second control mode is a control mode in which the lens controller 240 can detect the reverse rotation of the driving direction of the focus lens 230 based only on the result of detection by the configuration formed of the first encoder 231, the second encoder 232 and the counter 243. Then, the lens controller 240 switches the control mode from the first control mode to the second control mode according to the signal containing an instruction to start the autofocus operation sent from the camera body 100.

In this way, during the autofocus operation with the contrast system, the reverse rotation of the driving direction of the focus lens 230 is determined more accurately, thereby extracting the focal point more accurately. On the other hand, during the other operations, a simpler method for detecting the position of the focus lens 230 is employed, thereby making it easier to control the camera system 1.

More specifically, in Embodiment 1, the interchangeable lens 200 further includes the first encoder 231 and the second encoder 232 for detecting the driving amount of the focus motor 233. The lens controller 240 has a configuration that is capable of controlling the focus motor 233 based on the signal from the first encoder 231 in the first control mode and, on the other hand, controlling the focus motor 233 based on the signals from the first encoder 231 and the second encoder 232 in the second control mode.

Embodiment 2

As described above, in Embodiment 1, the exposure synchronizing signal of the CCD image sensor 110 has been used as the timing signal generated by the camera controller 140. In contrast, in Embodiment 2, a vertical synchronizing signal of the CCD image sensor 110 is used as the timing signal generated by the camera controller 140. It should be noted that a camera system according to Embodiment 2 of the present invention has a similar configuration to the camera system 1 according to Embodiment 1 and thus will be described with reference to the block diagram shown in FIG. 1.

Figure 5:
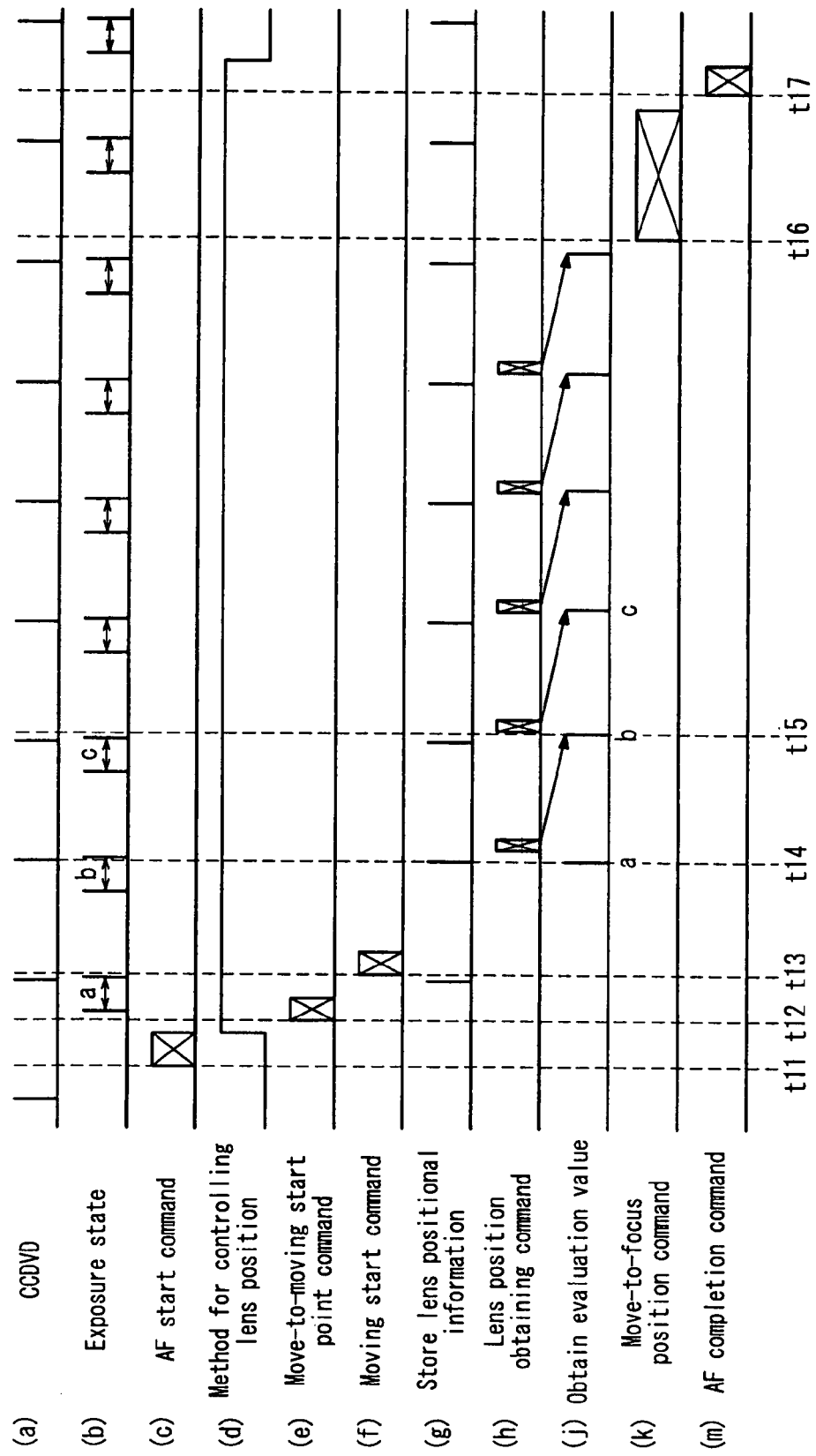
FIG. 5 is a timing chart for describing an autofocus operation with a contrast system in the camera system according to Embodiment 2.

FIG. 5 is a timing chart in an autofocus operation with a contrast system of the camera system 1 according to Embodiment 2.

As shown in FIG. 5(a), the camera controller 140 sends a vertical synchronizing signal both to the timing generator 112 and to the lens controller 240.

As shown in FIG. 5(b), the CCD image sensor 110 generates image data for calculating an AF evaluation value in synchronization with the vertical synchronizing signal based on the control of the timing generator 112, similarly to Embodiment 1.

On the other hand, as shown in FIG. 5(g), the lens controller 240 obtains positional information of the focus lens 230 at a timing of receiving the vertical synchronizing signal. In other words, the lens controller 240 obtains the number of pulses of the counter 243 at the timing of receiving the vertical synchronizing signal.

In this way, the camera controller 140 stores the AF evaluation value and the positional information of the focus lens 230 while associating them with each other. For example, as shown in FIG. 5(b), the AF evaluation value calculated based on the image data exposed in a period b (the image data generated in synchronization with the vertical synchronizing signal at timing t14) and the positional information of the focus lens 230 obtained in synchronization with the vertical synchronizing signal at timing t14 are stored in the DRAM 141 such that they are in association with each other (see the period b in FIG. 5(j)).

In this manner, the AF evaluation values can be stored sequentially in association with the positional information of the focus lens 230. Other points are similar to those illustrated in Embodiment 1.

Incidentally, although the AF evaluation value has been associated with the positional information of the focus lens 230 obtained in synchronization with the vertical synchronizing signal in Embodiment 2, there is no limitation to this. For example, it also may be possible to interpolate pieces of the positional information of the focus lens 230 obtained in synchronization with the vertical synchronizing signal, thereby calculating an average position of the focus lens 230 in the exposure period of the CCD image sensor 110, and then to associate this average position with the AF evaluation value.

Embodiment 3

Although the imaging device has been formed of the CCD image sensor 110 in Embodiment 1 of the present invention, it also may be formed of a MOS (metal oxide semiconductor) image sensor. Unlike the CCD image sensor, the MOS image sensor has varied exposure timings within a single screen. Thus, it is necessary to make the AF evaluation value and the positional information of the focus lens 230 correspond to each other, taking this into consideration. Thus, in the case of mounting the MOS image sensor, it is desired to capture a delay time of the exposure timings within a single screen (hereinafter, referred to as an exposure delay time, for the sake of convenience) and obtain the positional information of the focus lens 230 in synchronization with the exposure delay time.

Incidentally, the camera system including the MOS image sensor is equivalent to a configuration including the MOS image sensor instead of the CCD image sensor 110 in FIG. 1. Accordingly, the detailed description of the configuration of the camera system including the MOS image sensor (hereinafter, referred to as a camera system 3) will be omitted here.

Figure 6:
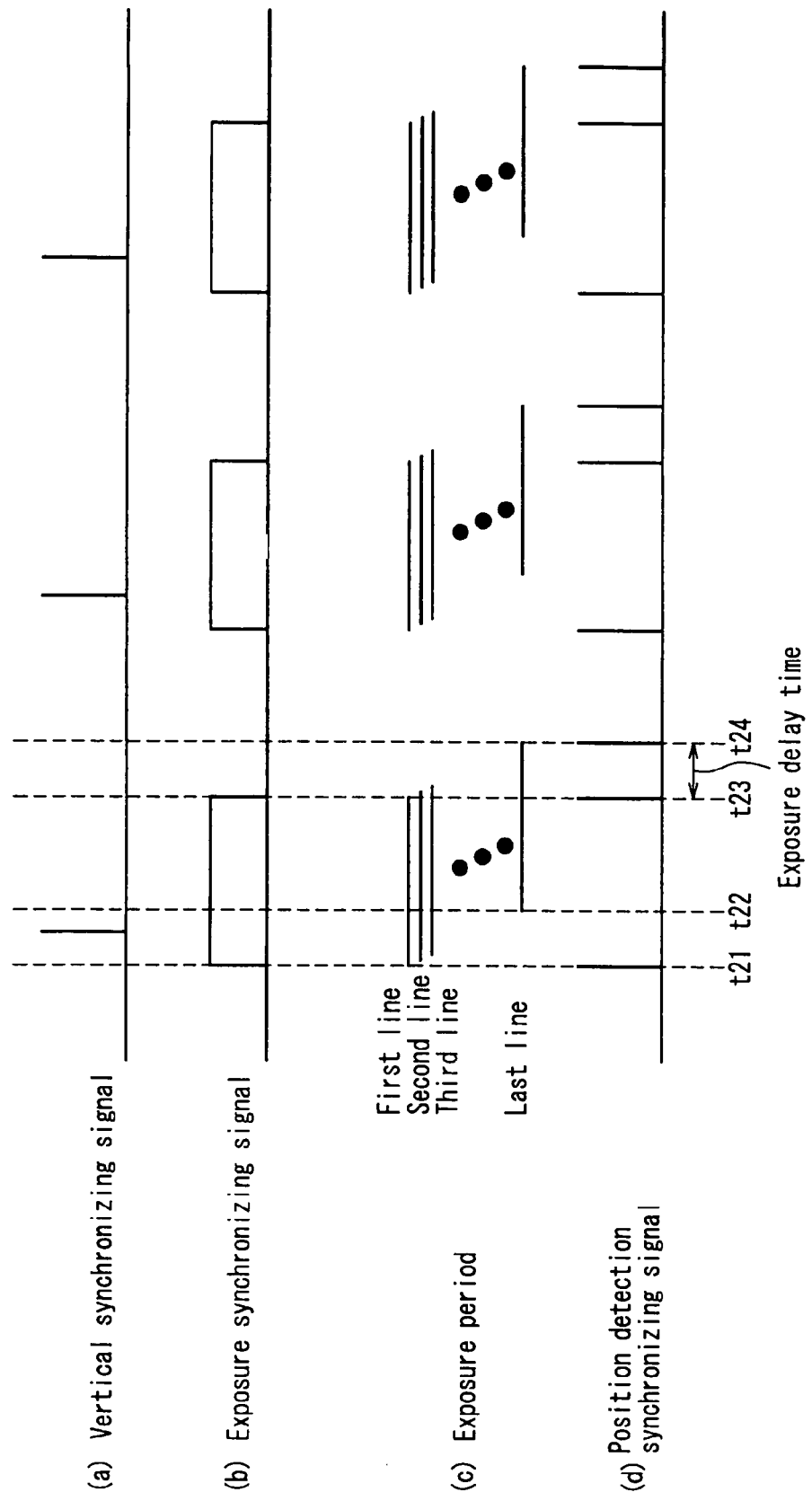
FIG. 6 is a timing chart showing exposure timings in a camera system according to Embodiment 3.

FIG. 6 is a timing chart showing exposure timings in the camera system 3. Also, in the camera system 3, the camera controller 140 generates a vertical synchronizing signal. Further, the camera controller 140 generates an exposure synchronizing signal. As shown in FIG. 6(b), the exposure synchronizing signal is in synchronization with the vertical synchronizing signal shown in FIG. 6(a).

When the exposure synchronizing signal rises, an exposure in a first line of the MOS image sensor is started as shown in FIG. 6(c) (at timing t21). Next, at a timing that is delayed a little, an exposure in a second line is started. In this manner, exposure start timings in the respective lines are shifted little by little, and an exposure is started at timing t22 in the last line. Thereafter, the exposure in the first line is completed at timing t23, and the exposure in the last line is completed at timing t24.

Herein, the delay time between timing t21 and timing t22 or the delay time between timing t23 and timing t24 is referred to as the exposure delay time. This exposure delay time is a value that is unique to each MOS image sensor, and is input by a manufacturer in advance at the time of manufacturing the camera body 100 and then captured by the camera controller 140. The exposure delay time is a substantially constant value that is not affected by the length of the exposure time.

Accordingly, the camera controller 140 can calculate an exposure end timing in the last line based on the exposure synchronizing signal. Then, the camera controller 140 generates corresponding position detection synchronizing signals at the times of rising and falling of the exposure synchronizing signal and the time of ending the exposure in the last line, respectively (see FIG. 6(d)).

The camera controller 140 sends the position detection synchronizing signals to the lens controller 240. The lens controller 240 receives them and reads out the pulse value of the counter 243 in synchronization with the position detection synchronizing signals. Then, the readout pulse value is sent to the camera controller 140.

As described above, the camera controller 140 also can obtain the positional information of the focus lens 230 at the exposure completion time in the last line, so that the AF evaluation value and the position of the focus lens can be made to correspond to each other more accurately.

Incidentally, although the positional information of the focus lens 230 at the exposure completion time of the last line has been obtained in Embodiment 3, there is no limitation to this. For example, the positional information of the focus lens 230 at the exposure start time of the last line also may be obtained. In short, the positional information of the focus lens 230 only has to be obtained at a timing related to the exposure delay time generated due to the use of the MOS image sensor.

Further, although the camera controller 140 has been configured to generate the position detection synchronizing signal at the timing related to the exposure delay time and send this position detection synchronizing signal to the lens controller 240 in Embodiment 3, there is no limitation to this. For example, the camera controller 140 also may be configured to send the exposure delay time to the lens controller 240 in advance. In this case, in the operation of preparing image forming shown in FIG. 2, it is appropriate that the camera controller 140 notify the lens controller 240 of the exposure delay time. Also, in this case, it is appropriate that the camera controller 140 send the exposure synchronizing signal to the lens controller 240, and the lens controller 240 generate a signal corresponding to the position detection synchronizing signal based on the received exposure synchronizing signal and the notified exposure delay time and obtain the positional information of the focus lens 230 in synchronization with this signal.

Embodiment 4

In Embodiments 1 to 3 of the present invention, the description mainly has been directed to the autofocus operation with the contrast system at the time of forming a still image. In Embodiment 4, the autofocus operation with the contrast system at the time of forming a moving image will be discussed. It should be noted that the "forming a moving image" in Embodiment 4 includes forming a moving image for a through image and forming a moving image to be recorded in the memory card 171.

Since a configuration of a camera system in Embodiment 4 is similar to that of the camera system 1 in Embodiment 1 of the present invention shown in FIG. 1, the description thereof will be omitted here.

The camera controller 140 sends an exposure synchronizing signal to the lens controller 240. This sending operation is carried out at the time not only of forming a still image but also of forming a moving image. Then, the lens controller 240 performs a wobbling control in synchronization with the exposure synchronizing signal. Here, the "wobbling control" is a control performed by the lens controller 240. In the wobbling control mode, the lens controller 240 controls the focus motor 233 so as to move the focus lens 230 forward and backward periodically by a minute distance. In this way, the camera controller 140 immediately can grasp the moving direction of the focus lens 230 for bringing a subject into focus when the position of the subject relative to the camera varies during the moving image forming.

The prime purpose of the present invention is to synchronize the wobbling control to the exposure synchronizing signal. This makes it possible to synchronize the moving image forming by the CCD image sensor 110 and the wobbling control of the focus lens 230 easily. This can minimize the influence of the wobbling by a simple method, thereby allowing a favorable moving image to be formed. Also, since it is possible to reduce the number of the kinds of information necessary for wobbling sent from the camera controller 140 to the lens controller 240, the camera system 1 can be controlled more easily.

Figure 7:
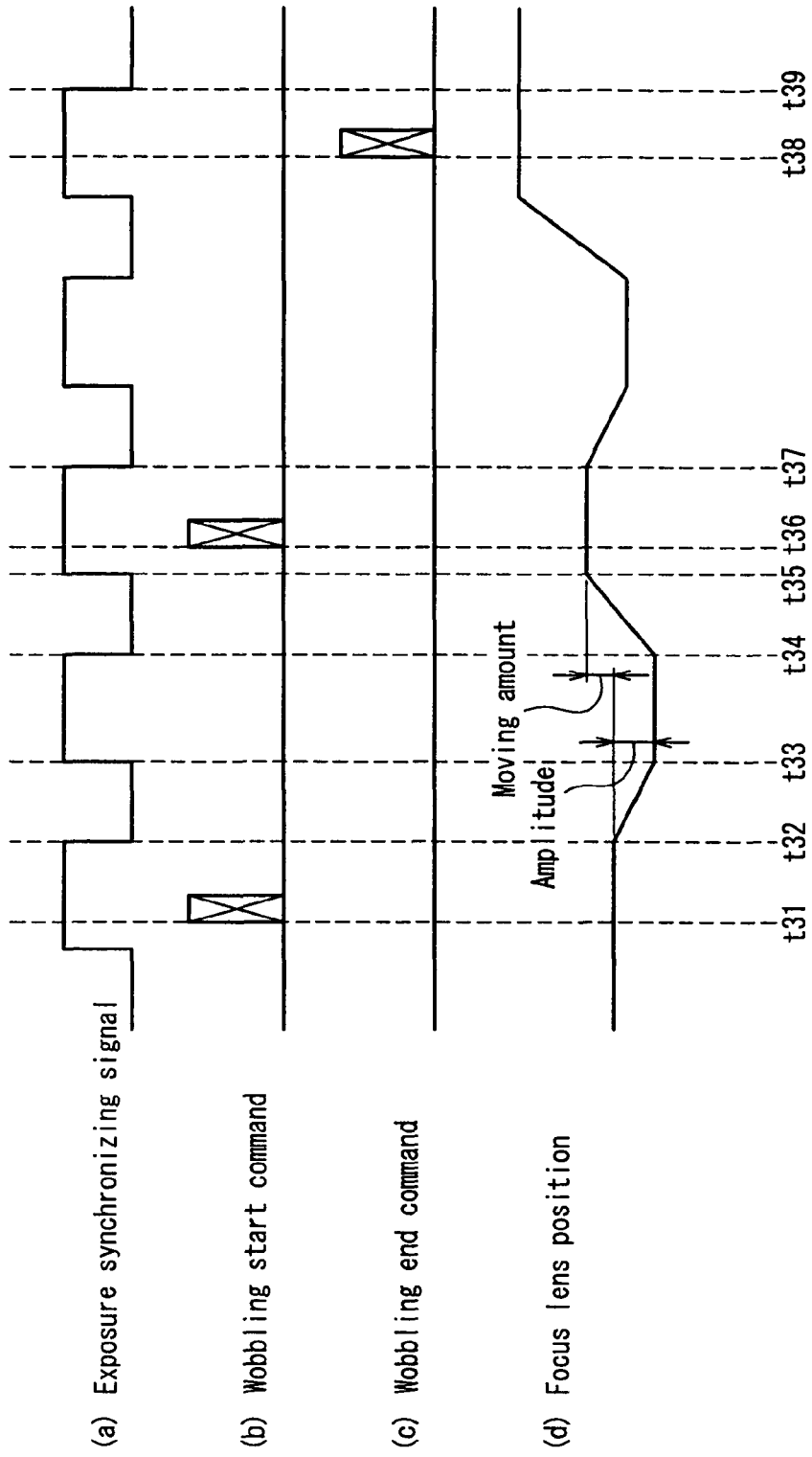
FIG. 7 is a timing chart showing timings of a wobbling operation in a camera system according to Embodiment 4.

Referring to FIG. 7, the wobbling operation in Embodiment 4 will be described in detail. FIG. 7 is a timing chart during the wobbling operation.

As shown in FIG. 7(a), the camera controller 140 sends an exposure synchronizing signal to the lens controller 240. Also, when starting the wobbling operation, the camera controller 140 sends the lens controller 240 a wobbling start command indicating that the wobbling operation is started. Here, the camera controller 140 sends the wobbling start command at timing t31. This wobbling start command includes amplitude and moving amount of the wobbling. The "amplitude" refers to amplitude of minute vibrations of the focus lens 230. The "moving amount" refers to the difference in amplitudes of the first and last of one cycle of the minute vibrations. If the moving amount is not 0 but has a positive or negative value, the focus lens 230 is moving in one direction while wobbling. On the other hand, if the moving amount is 0, the focus lens 230 is wobbling at a constant position.

When the lens controller 240 receives the wobbling start command, it starts the wobbling control in synchronization with the next falling timing of the exposure synchronizing signal (at timing t32). In the wobbling control, when the exposure synchronizing signal is High, the lens controller 240 controls the focus motor 233 so as to keep the focus lens 230 at a constant position. On the other hand, when the exposure synchronizing signal is Low, the lens controller 240 controls the focus motor 233 so as to move the focus lens 230. The CCD image sensor 110 forms one frame of a moving image when the exposure synchronizing signal is High. During this period, the focus lens 230 is not moved, thus minimizing the influence of the wobbling operation on the moving image forming. Thus, as shown in FIG. 7(d), the focus lens 230 is moved between timings t32 and t33 and between timings t34 and t35 (these periods are referred to as stop periods), and the focus lens 230 is kept at a constant position between timings t33 and t34 and between timings t35 and t37 (these periods are referred to as exposure periods). Incidentally, as shown in FIG. 7(a) and FIG. 7(d), two cycles of the exposure synchronizing signal corresponds to one cycle of the wobbling operation.

According to the amplitude and moving amount included in the wobbling start command, the lens controller 240 moves the focus lens 230 in a negative direction by the amplitude in the period from timings t32 to t33, keeps it at a constant position in the period from timings t33 to t34, moves it in a positive direction by a sum of the amplitude and moving amount in the period from timings t34 to t35, and keeps it at a constant position in the period from timings t35 to t37.

Next, at timing t36, the camera controller 140 sends another wobbling start command. Then, the lens controller 240 updates the wobbling control according to amplitude and moving amount included in the new wobbling start command (at timing t37).

Finally, at the time of ending the wobbling operation, the camera controller 140 sends a wobbling end command to the lens controller 240 (at timing t38). See FIG. 7(c). The lens controller 240 receives this command and ends the wobbling control (at timing t39).

As described above, the camera system 1 according to Embodiment 4 of the present invention includes the interchangeable lens 200 and the camera body 100. The camera body 100 includes the camera controller 140 that generates the exposure synchronizing signal periodically, the CCD image sensor 110 that performs exposure at the timing in correlation with the generated exposure synchronizing signal and generates the image data, and the camera controller 140 that calculates the evaluation value for autofocus based on the generated image data and controls the camera body 100. The interchangeable lens 200 includes the focus lens 230 that moves forward and backward along the optical axis direction, thereby varying the focusing state of the subject image, the focus motor 233 for driving the focus lens 230, and the lens controller 240 that controls the focus motor 233 according to the control signal from the camera controller 140. Then, the lens controller 240 obtains the exposure synchronizing signal generated by the camera controller 140 from the camera body 100 and controls the focus motor 233 so as to move the focus lens 230 forward and backward by the minute distance periodically in synchronization with the obtained exposure synchronizing signal.

In this way, with a simple configuration, it is possible to synchronize the moving image forming by the CCD image sensor 110 and the wobbling control of the focus lens 230 easily. This can suppress the influence of the wobbling by a simple method, thereby allowing a favorable moving image to be formed.

Now, assuming that the camera controller 140 does not send the exposure synchronizing signal to the lens controller 240, the following operations would be conceivable. First, there is an operation in which the camera controller 140 sends the lens controller 240 a control signal related to the wobbling in synchronization with the exposure synchronizing signal. Second, the lens controller 240 may generate a signal matching with the exposure synchronizing signal for itself and perform the wobbling control in synchronization with that signal. Both of them complicate the communication between the camera body 100 and the interchangeable lens 200 or make it more difficult to synchronize the exposure timing and the wobbling control. Therefore, the configuration in which the camera controller 140 sends the exposure synchronizing signal to the lens controller 240 and the lens controller 240 performs the wobbling control in synchronization with the exposure synchronizing signal as in the present invention simplifies the communication between the camera body 100 and the interchangeable lens 200 or makes it easier to synchronize the exposure timing and the wobbling control. Accordingly, with a simple method, it is possible to form a favorable moving image with suppressed wobbling influence.

Other Embodiments

In the above description, Embodiments 1 to 4 have been discussed as the embodiments of the present invention. However, the present invention is not limited to them. Thus, this section will discuss other embodiments of the present invention.

In Embodiment 1 of the present invention, the second control mode using the first encoder 231 and the second encoder 232 has been illustrated. However, the second control mode of the present invention is not limited to this. For example, the second control mode also can be realized in the case of using one encoder and a linear position detection sensor. The linear position detection sensor is, for example, a position sensor that can be achieved by a linear resistor that has the same length as a driving range of the focus lens 230 and a contact that moves together with the driving of the focus lens 230 while contacting an upper surface of the resistor. In short, the second control mode only has to have a relatively higher position detection accuracy of the reverse rotation of the driving direction of the focus lens 230 that is not intended by the lens controller 240 compared with the first control mode.

In Embodiments 1 to 3 of the present invention, the configuration in which the zoom lens 210 and the OIS lens 220 are provided has been illustrated. However, they are not always necessary for the present invention. In other words, the present invention also is applicable to a camera system provided with a single focus lens having no zooming function or a camera system provided with an interchangeable lens having no camera shake correcting function.

Although Embodiments 1 to 3 of the present invention have illustrated the camera body including no movable mirror, the present invention is not limited to this. For example, it also may be possible to provide a movable mirror in the camera body or provide a prism for splitting the subject image in the camera body. Alternatively, the movable mirror may be provided not in the camera body but in an adapter.

In Embodiments 1 to 3 of the present invention, the position of the focus lens 230 has not been detected directly but has been detected indirectly by detecting the angle of rotation of the rotation shaft of the focus motor 233. As described above, in the present invention, the position of the focus lens 230 may be detected directly or detected indirectly by detecting the position of the mechanism member moving together with the focus lens 230. In short, the position of the focus lens only has to be identified in the end.

Embodiments 1 to 3 of the present invention have illustrated the camera system including no phase difference detection sensor. However, the present invention is not limited to such examples. It also may be possible to provide a phase difference detection sensor, thereby executing an autofocus operation of a phase difference system and the autofocus operation with the contrast system selectively. In this case, the present invention is applicable when the autofocus operation with the contrast system is executed.

In Embodiment 1 of the present invention, the exposure synchronizing signal of the CCD image sensor 110 has been illustrated as an example of the timing signal of the present invention. However, the timing signal of the present invention is not limited to the exposure synchronizing signal. For example, the vertical synchronizing signal and the electronic shutter driving signal for the CCD image sensor 110 may be sent to the lens controller 240 as the timing signal. This eliminates the need for the camera controller 140 to send the exposure synchronizing signal, making the control easier. However, in this case, the camera controller 140 has to notify the lens controller 240 of the specification of the electronic shutter driving signal (the emission interval, the number of emissions, etc. within one group) in advance. According to the notified specification, the lens controller 240 reads out the pulse value of the counter 243 based on the electronic shutter driving signal and the vertical synchronizing signal.

Figure 8:
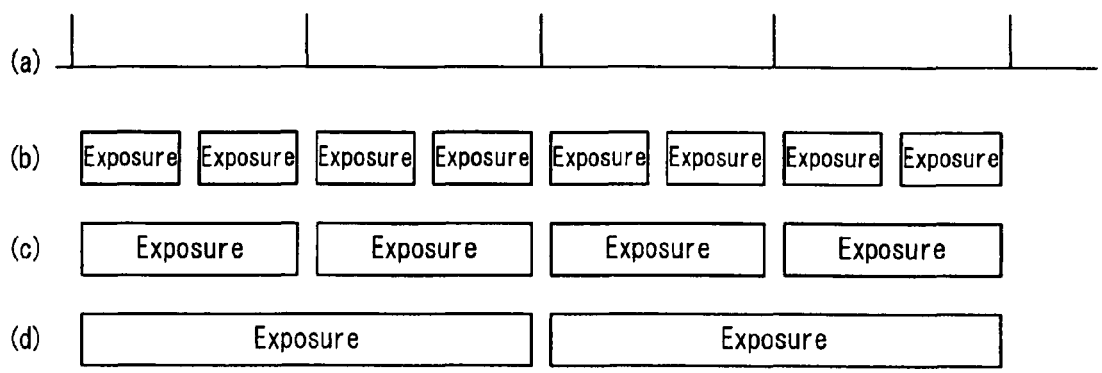
FIG. 8 is a timing chart showing a vertical synchronizing signal and exposure periods according to Embodiment 4.

In Embodiment 4 of the present invention, the camera controller 140 has sent the exposure synchronizing signal to the lens controller 240 so as to synchronize the wobbling operation to the exposure synchronizing signal. However, the present invention is not limited to this control. For example, the camera controller 140 may send a vertical synchronizing signal to the lens controller 240 so as to synchronize the wobbling operation to the vertical synchronizing signal. FIG. 8 is a timing chart of the vertical synchronizing signal and exposure periods. FIG. 8(a) indicates the vertical synchronizing signal, FIG. 8(b) indicates the exposure periods when they have twice the frequency of the vertical synchronizing signal, FIG. 8(c) indicates the exposure periods when they have the same frequency as the vertical synchronizing signal, and FIG. 8(d) indicates the exposure periods when they have ½ the frequency of the vertical synchronizing signal. In this case, it should be noted that the camera controller 140 has to send the lens controller 240 information indicating the timings of the vertical synchronizing signal and the exposure periods. This is because the lens controller 240 cannot identify the period in which the focus lens 230 is kept at a constant position during the wobbling operation period only from the vertical synchronizing signal. The information indicating the timings of the vertical synchronizing signal and the exposure periods includes frequencies representing the cycle of the exposure period with respect to the vertical synchronizing signal, and information specifying the period in which the focus lens 230 is kept at a constant position during the wobbling operation period, for example. Conversely, in Embodiment 4 of the present invention, since the camera controller 140 has sent the exposure synchronizing signal to the lens controller 240 so as to synchronize the wobbling operation to the exposure synchronizing signal, no communication of the frequencies representing the cycle of the exposure period with respect to the vertical synchronizing signal or of the information for specifying the period in which the focus lens 230 is kept at a constant position during the wobbling operation period is necessary, thus making it possible to simplify the communication.

In Embodiment 4 of the present invention, the camera controller 140 has sent the exposure synchronizing signal to the lens controller 240 so as to synchronize the wobbling operation to the exposure synchronizing signal. However, the present invention is not limited to this control. For example, the camera controller 140 may send a vertical synchronizing signal to the lens controller 240 so as to synchronize the wobbling operation to the vertical synchronizing signal. In this case, it should be noted that the camera controller 140 has to send the lens controller 240 information indicating the timings of the vertical synchronizing signal and the exposure periods. This is because the lens controller 240 cannot identify the period in which the focus lens 230 is kept at a constant position during the wobbling operation period only from the vertical synchronizing signal. The information indicating the timings of the vertical synchronizing signal and the exposure periods includes information specifying a stop period, for example. Conversely, in Embodiment 4 of the present invention, since the camera controller 140 has sent the exposure synchronizing signal to the lens controller 240 so as to synchronize the wobbling operation to the exposure synchronizing signal, no communication of the information for specifying the stop period is necessary, thus making it possible to simplify the communication.

Further, the camera body 100 may send the lens controller 240 a trigger signal for starting the communication with the interchangeable lens 200 as the timing signal. This eliminates the need for the camera controller 140 to send the exposure synchronizing signal to the lens controller 240, thus making the control easier. However, in this case, the camera controller 140 has to measure a delay time from the time when the above-noted trigger signal is sent until the lens controller 240 responds thereto in advance. Based on the trigger signal, the lens controller 240 reads out the pulse value of the counter 243. The camera controller 140 corrects the pulse value read out by the lens controller 240 using the driving speed of the focus lens 230 and the above-noted delay time. This makes it possible to obtain the positional information of the focus lens 230 corresponding to the above-described trigger signal.

The present invention is applicable to camera systems with an interchangeable lens. More specifically, the present invention is applicable to digital still cameras, video cameras or the like.

[Note 1]

A first camera system according to the present invention includes an interchangeable lens and a camera body. The camera body includes a signal generating portion that generates a timing signal periodically, an imaging device that generates image data by exposure at a timing in correlation with the timing signal generated by the signal generating portion, an evaluation value calculating portion that calculates an evaluation value for autofocus based on the image data generated by the imaging device, and a body control portion that controls the camera body. The interchangeable lens includes a focus lens that moves forward and backward along an optical axis direction, thereby varying a focusing state of a subject image, a driving member that drives the focus lens, a position detection portion that detects a position of the focus lens or a mechanism member moving together with the focus lens, and a lens control portion that controls the driving member according to a control signal from the body control portion. The lens control portion obtains the timing signal that is generated by the signal generating portion from the camera body, causes the position detection portion to detect the position of the focus lens or the mechanism member according to the obtained timing signal, and notifies the camera body of the detected position of the focus lens or the mechanism member. The body control portion associates the position of the focus lens or the mechanism member obtained from the lens control portion with the evaluation value calculated by the evaluation value calculating portion based on the timing signal that is generated by the signal generating portion, and controls an autofocus operation of the camera system based on the position and evaluation value that are associated with each other.

In this manner, the body control portion sends the timing signal to the lens control portion, and the lens control portion obtains the position of the focus lens or the mechanism member in synchronization with the timing signal, so that the body control portion can determine accurately the timing of obtaining the position of the focus lens or the mechanism member. Also, the body control portion can calculate the evaluation value in synchronization with the timing signal. Accordingly, it is possible to make the position of the focus lens or the mechanism member obtained from the lens control portion and the calculated evaluation value correspond to each other accurately. Thus, in the autofocus operation with the contrast system, the focal point can be determined accurately. In this way, the camera system with a favorable focusing state can be achieved.

[Note 2]

In the first camera system according to the present invention, the timing signal that is generated by the signal generating portion can be configured to include a signal indicating a start timing of the exposure in the imaging device and a signal indicating an end timing of the exposure in the imaging device.

In this way, the interchangeable lens can obtain a focus position in synchronization with the exposure timing of the imaging device. Further, since a signal providing notification of the start timing of the exposure and a signal providing notification of the end timing of the exposure are control signals that have a small amount of information, a data amount for communication of the control signals is only small.

[Note 3]

In the first camera system according to the present invention, the timing signal that is generated by the signal generating portion can be configured to include a vertical synchronizing signal for driving the imaging device and an electronic shutter driving signal for driving an electronic shutter in the imaging device.

In this way, the interchangeable lens can obtain a focus position in synchronization with the exposure timing of the imaging device.

[Note 4]

In the first camera system according to the present invention, the timing signal that is generated by the signal generating portion can be configured to be a vertical synchronizing signal for driving the imaging device.

[Note 5]

A second camera system according to the present invention includes an interchangeable lens and a camera body. The camera body includes a signal generating portion that generates a timing signal periodically, an imaging device that generates image data by exposure at a timing in correlation with the timing signal generated by the signal generating portion, an evaluation value calculating portion that calculates an evaluation value for autofocus based on the image data generated by the imaging device, and a body control portion that both generates a trigger signal for starting communication with the interchangeable lens and controls the camera body. The interchangeable lens includes a focus lens that moves forward and backward along an optical axis direction, thereby varying a focusing state of a subject image, a driving member that drives the focus lens, a position detection portion that detects a position of the focus lens or a mechanism member moving together with the focus lens, and a lens control portion that controls the driving member according to a control signal from the body control portion. The lens control portion obtains the trigger signal that is generated by the body control portion from the camera body, causes the position detection portion to detect the position of the focus lens or the mechanism member according to the obtained trigger signal, and notifies the camera body of the detected position of the focus lens or the mechanism member. The body control portion associates the position of the focus lens or the mechanism member obtained from the lens control portion with the evaluation value calculated by the evaluation value calculating portion based on the trigger signal that is generated by the body control portion, and controls an autofocus operation of the camera system based on the position and evaluation value that are associated with each other.

This eliminates the need for the body control portion to send the exposure synchronizing signal to the lens control portion, thus making the control easier.

[Note 6]

A third camera system according to the present invention includes an interchangeable lens and a camera body. The camera body includes an imaging device that generates image data, and a body control portion that controls an autofocus operation of the camera system based on the image data generated by the imaging device. The interchangeable lens includes a focus lens that moves forward and backward along an optical axis direction, thereby varying a focusing state of a subject image, a driving member that drives the focus lens, a position detection portion that detects a position of the focus lens or a mechanism member moving together with the focus lens, and a lens control portion that controls the driving member in a first control mode or a second control mode based on the position of the focus lens or the mechanism member detected by the position detection portion. In the first control mode, the lens control portion cannot detect a reverse rotation of a driving direction of the focus lens based only on a result of detection by the position detection portion. In the second control mode, the lens control portion can detect the reverse rotation of the driving direction of the focus lens based only on the result of detection by the position detection portion. The lens control portion switches a control mode from the first control mode to the second control mode in response to a signal from the camera body indicating that the autofocus operation is started.

In this way, during the autofocus operation with the contrast system, the reverse rotation of the driving direction of the focus lens is determined more accurately, thereby extracting the focal point more accurately. On the other hand, during the other operations, a simpler method for detecting the position of the focus lens (the first control mode) is employed, thereby making it easier to control the camera system.

[Note 7]

In the third camera system according to the present invention, the interchangeable lens further can include a first encoder and a second encoder that detect a driving amount of the driving member, and the lens control portion can be configured to control the driving member based on a signal from the first encoder in the first control mode and, on the other hand, control the driving member based on signals from the first encoder and the second encoder in the second control mode.

This makes it possible to utilize the detection result of the encoders and/or a linear position detection sensor selectively. Therefore, an appropriate detection method can be adopted according to the accuracy necessary for driving control.

[Note 8]

In the third camera system according to the present invention, the interchangeable lens further can include an encoder that detects a driving amount of the driving member and a linear position detection sensor that detects the position of the mechanism member moving together with the focus lens, and the lens control portion can be configured to control the driving member based on a signal from the encoder in the first control mode and, on the other hand, control the driving member based on signals from the encoder and the linear position detection sensor in the second control mode.

This makes it possible to utilize the detection result of the encoder and/or the linear position detection sensor selectively. Therefore, an appropriate detection method can be adopted according to the accuracy necessary for driving control.

[Note 9]

A fourth camera system according to the present invention includes an interchangeable lens and a camera body. The camera body includes a signal generating portion that generates a timing signal periodically, an imaging device that generates image data by exposure at a timing in correlation with the timing signal generated by the signal generating portion, an evaluation value calculating portion that calculates an evaluation value for autofocus based on the image data generated by the imaging device, and a body control portion that controls the camera body. The interchangeable lens includes a focus lens that moves forward and backward along an optical axis direction, thereby varying a focusing state of a subject image, a driving member that drives the focus lens, and a lens control portion that controls the driving member according to a control signal from the body control portion. The lens control portion obtains the timing signal that is generated by the signal generating portion from the camera body, and controls the driving member so as to move the focus lens forward and backward periodically by a minute distance in synchronization with the obtained timing signal.

In this manner, the cycle of the forward and backward movement by the minute distance and the exposure of the camera body are synchronized, so that whether the focus is on a far side or a near side can be determined promptly. Accordingly, it is possible to carry out an autofocus operation at a high speed. Also, by shifting the forward and backward movement by the minute distance either to the far side or to the near side, the continuous autofocus control is achieved.

[Note 10]

In the fourth camera system according to the present invention, the body control portion can be configured to send the lens control portion an amplitude and a moving amount but not at least one of a frequency and a stop period when moving the focus lens forward and backward periodically by the minute distance.

In this manner, since the frequency and the stop period of the forward and backward movement by the minute distance do not have to be controlled by communication, it is possible to reduce the load for the control.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A camera system comprising:
an interchangeable lens; and
a camera body;
wherein the camera body comprises
a signal generating portion that generates a timing signal periodically,
an imaging device that generates image data by exposure at a timing in correlation with the timing signal generated by the signal generating portion,
an evaluation value calculating portion that calculates an evaluation value for autofocus based on the image data generated by the imaging device, and
a body control portion that controls the camera body, the interchangeable lens comprises
a focus lens that moves forward and backward along an optical axis direction, thereby varying a focusing state of a subject image,
a driving member that drives the focus lens,
a position detection portion that detects a position of the focus lens or a mechanism member moving together with the focus lens, and
a lens control portion that controls the driving member according to a control signal from the body control portion,
the lens control portion obtains the timing signal that is generated by the signal generating portion from the camera body, causes the position detection portion to detect the position of the focus lens or the mechanism member according to the obtained timing signal, and notifies the camera body of the detected position of the focus lens or the mechanism member, and
the body control portion associates the position of the focus lens or the mechanism member obtained from the lens control portion with the evaluation value for autofocus based on the image data generated by the imaging device that is calculated by the evaluation value calculating portion based on the timing signal that is generated by the signal generating portion, and controls an autofocus operation of the camera system based on the position and evaluation value that are associated with each other.

2. The camera system according to claim 1, wherein the timing signal that is generated by the signal generating portion comprises a signal indicating a start timing of the exposure in the imaging device and a signal indicating an end timing of the exposure in the imaging device.

3. The camera system according to claim 1, wherein the timing signal that is generated by the signal generating portion comprises a vertical synchronizing signal for driving the imaging device and an electronic shutter driving signal for driving an electronic shutter in the imaging device.

4. The camera system according to claim 1, wherein the timing signal that is generated by the signal generating portion is a vertical synchronizing signal for driving the imaging device.

5. The camera system according to claim 1, wherein
the lens control portion controls the driving member in a first control mode or a second control mode,
in the first control mode, the lens control portion does not detect a reverse rotation of a driving direction of the focus lens,
in the second control mode, the lens control portion detects the reverse rotation of the driving direction of the focus lens, and
the lens control portion switches a control mode from the first control mode to the second control mode in response to a signal from the camera body indicating that an autofocus operation is started.

6. The camera system according to claim 5, wherein
the position detection portion comprises a first encoder and a second encoder that detect a driving amount of the driving member, and
the lens control portion controls the driving member based on a signal from the first encoder in the first control mode and, on the other hand, controls the driving member based on signals from the first encoder and the second encoder in the second control mode.

7. The camera system according to claim 5, wherein
the position detection portion comprises an encoder that detects a driving amount of the driving member and a linear position detection sensor that detects the position of the mechanism member moving together with the focus lens, and
the lens control portion controls the driving member based on a signal from the encoder in the first control mode and, on the other hand, controls the driving member based on signals from the encoder and the linear position detection sensor in the second control mode.

8. The camera system according to claim 1, wherein
the lens control portion further is operable to control the driving member so as to move the focus lens forward and backward periodically by a minute distance in synchronization with the timing signal obtained from the camera body, and cause the position detection portion to detect the position of the focus lens moved forward and backward periodically by the minute distance or the mechanism member according to the obtained timing signal.

9. The camera system according to claim 8, wherein the body control portion sends the lens control portion an amplitude and a moving amount but not at least one of a frequency and a stop period when moving the focus lens forward and backward periodically by the minute distance.

* * * * *